UNITED STATES PATENT OFFICE.

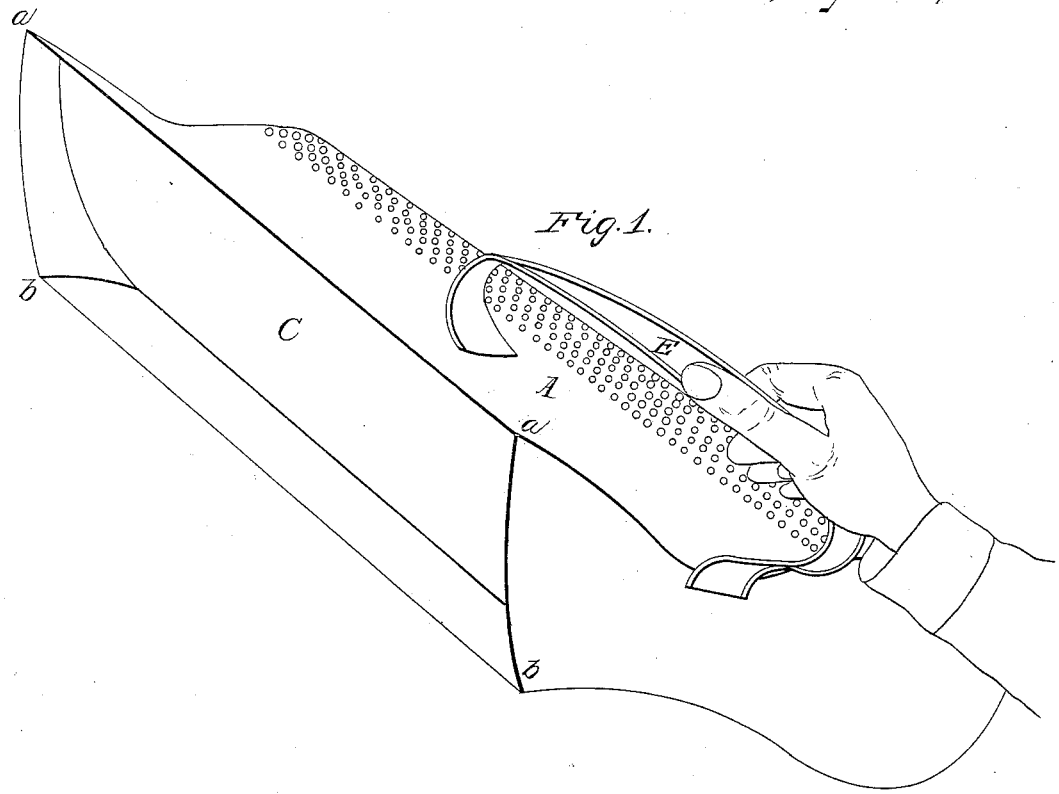
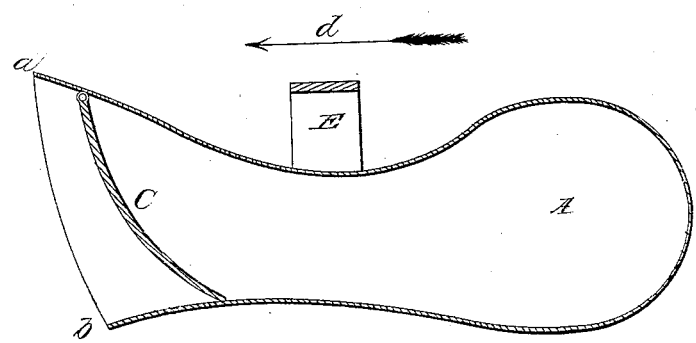

S. R. WILMOT, OF WATERTOWN, CONNECTICUT.

FLY-TRAP.

Specification of Letters Patent No. 18,261, dated September 22, 1857.

*To all whom it may concern:*

Be it known that I, SAMUEL R. WILMOT, of Watertown, in the county of Litchfield and State of Connecticut, have invented a new and useful Improvement in Apparatus for Catching Flies; and I do hereby declare that the following is a full, clear, and exact description of my said invention, reference being had to the accompanying drawing, in which—

Figure 1 represents a view in perspective of my fly-trap and Fig. 2 a vertical transverse section of the same.

The object of my invention is to catch the flies that settle upon flat surfaces, such as eating tables, after the plates and dishes have been removed, and when the table cloth is covered to a greater or less extent with bread crumbs or other particles of food, or is soiled with coffee, tea, or other liquids which naturally attract flies.

My invention consists in a receptacle having a mouth which is fitted with a valve or is made to open and close in such manner that when the receptacle or fly trap is swept rapidly across a table cloth the mouth is open to receive all small objects with which its lower lip comes in contact, and when the sweeping movement is finished the mouth is closed to prevent their escape.

A fly-trap constructed according to the principles of my invention is represented in the accompanying drawing. In it the body or receptacle A is formed of tin-plate, the parts of which are cut and bent into shape and soldered together so as to form a sort of broad and shallow pocket. The mouth $a, a, b, b$, of this pocket is in this instance fitted with a self acting flap valve C, which is hinged just within the upper lip $a, a$, and falls in an inclined position to the lower lip $b, b$, upon which its lower edge rests. The hinge of this valve is made very flexible, so that a sudden movement of the fly-trap in the direction of the arrow $d$ will cause the valve to flap back and leave the mouth of the trap unobstructed. The hinder part of the trap is perforated with small holes as shown at Fig. 1, and although this mode of construction is not essential to the successful use of the instrument it is nevertheless advantageous, as it permits a current of air to pass through the trap as the latter is rapidly moved, and thus facilitates the opening of the valve; the perforation is also advantageous in permitting the free access of water when the trap is immersed therein to kill the flies that have been caught. The upper side of the instrument is fitted with a handle E by which it can readily be operated.

The operation of this instrument is analogous to the operation of catching a fly by the human hand by a rapid movement of the arm, in which case the hand acts as the receptacle and the fingers as the valve. Thus when a table is to be cleansed of the flies that may have settled thereupon, the instrument is grasped by the handle and is swept rapidly over the table with its lower lip $b, b$, in contact with the surface of the table. The immediate result of the rapid movement is to cause the valve to flap back leaving the mouth open so that the flies, crumbs, &c., with which the lower lip comes in contact are swept into the receptacle; as soon as the movement of the arm ceases, the flap valve falls, thus closing the mouth and preventing the escape of the contents. The operation may be repeated a number of times before the flies are killed and the trap is emptied, or this may be done at once. The most convenient method of killing the flies is to immerse the trap in a bucket of water which drowns them; as the trap is drawn from the water it is drained, the valve is then raised by hand, and the contents are jarred out by gently striking the trap with its mouth downward upon some stationary object.

The instrument thus described is at once cheap and efficient; as its mouth is broad it sweeps over a large portion of the table at a time, and by its use the flies in an eating house may be rapidly caught and destroyed; it is particularly useful in such cases as it acts both as a crumb scraper and fly-trap. It may be made of various materials, as of cloth or net work, or of iron wire gauze, in place of sheet metal. It may also be ornamented by painting or japanning, and may be made of any ornamental configuration which will not interfere with its action.

Having thus described my invention what I claim as new and desire to secure by Letters Patent is—

A fly-trap constructed substantially as herein set forth and consisting of a receptacle which is constructed and operated in such manner that when it is swept over a table or other object the mouth is open to receive flies and when the sweeping movement is finished the mouth is closed to prevent their escape.

In testimony whereof I have hereunto subscribed my name.

S. R. WILMOT.

Witnesses:
    Wm. Cosgrove,
    W. L. Bennem.